(12) United States Patent
Többen

(10) Patent No.: US 8,634,806 B2
(45) Date of Patent: Jan. 21, 2014

(54) METHOD FOR REGISTERING A MOBILE PART AT A BASE STATION AND RADIO-CONTROLLED COMMUNICATION SYSTEM HAVING SUCH A METHOD

(75) Inventor: Willfried Többen, Löningen (DE)

(73) Assignee: Gigaset Communications GmbH, Munich (DE)

( * ) Notice: Subject to any disclaimer, the term of this patent is extended or adjusted under 35 U.S.C. 154(b) by 194 days.

(21) Appl. No.: 12/740,324

(22) PCT Filed: Oct. 27, 2008

(86) PCT No.: PCT/EP2008/064505
§ 371 (c)(1),
(2), (4) Date: Apr. 28, 2010

(87) PCT Pub. No.: WO2009/056512
PCT Pub. Date: May 7, 2009

(65) Prior Publication Data
US 2010/0255814 A1  Oct. 7, 2010

(30) Foreign Application Priority Data
Oct. 31, 2007 (DE) .......................... 10 2007 000 613

(51) Int. Cl.
*H04M 1/66* (2006.01)
(52) U.S. Cl.
USPC ............ 455/411; 455/465; 455/418; 455/419; 455/420; 455/435.1; 455/462; 455/463; 713/184; 713/185; 340/5.22; 340/5.5
(58) Field of Classification Search
USPC ............. 455/88, 411, 418–420, 426.2, 435.1, 455/462, 463, 465; 340/5.22, 5.5; 380/247, 380/249, 270, 273; 713/184, 185, 191, 194
See application file for complete search history.

(56) References Cited

U.S. PATENT DOCUMENTS

| 5,625,888 A | 4/1997 | Ruther et al. |
| 5,640,680 A * | 6/1997 | Ishida et al. ................. 455/517 |
| 6,832,082 B1 * | 12/2004 | Ramaswamy et al. ........ 455/411 |
| 7,266,373 B2 | 9/2007 | Aubauer et al. |

OTHER PUBLICATIONS

GIGASET SL 740 Manual, Information and Communication Mobile; Siemens AG 2004.
European Telecommunications Standards Institute (Sep. 1, 1997) "Digital Enhanced Cordless Telecommunications (DECT); Common Interface (CI); Part 7: Security features; ETS 300 175-7" European Telecommunication Standard, 3: 1-105.

* cited by examiner

*Primary Examiner* — Rafael Pérez-Gutiérrez
*Assistant Examiner* — Thai Vu
(74) *Attorney, Agent, or Firm* — KPPB LLP

(57) ABSTRACT

In regard to a radio-controlled communication system (1), which comprises a base station (2) and at least one single mobile part (3), a registration procedure, which is simplified for a user, is proposed for registering the mobile part (3) at the base station (2). The registration procedure operates such that upon a first PIN request by the base station (2) to the mobile part (3), the mobile part (3) automatically transmits a so-called default PIN to the base station (3). If said default PIN is correct, the registration procedure is successful. If said default PIN is incorrect, the base station (2) checks for the existence of the so-called default PIN. If said default PIN does not exist, the registration procedure is ended. If the PIN exists, a user of the mobile part (3) receives the possibility to manually input the PIN, and the registration procedure is continued upon the check of the transmitted PIN for correctness.

9 Claims, 2 Drawing Sheets

METHOD FOR REGISTERING A MOBILE PART AT A BASE STATION AND RADIO-CONTROLLED COMMUNICATION SYSTEM HAVING SUCH A METHOD

CROSS-REFERENCE TO RELATED APPLICATIONS

This application is a §371 national stage entry of International Application No. PCT/EP2008/064505, filed Oct. 27, 2008, which claims priority to German Patent Application No. 10 2007 000 613.8, filed Oct. 31, 2007, both of which are hereby incorporated by reference.

FIELD OF THE INVENTION

The invention relates to a method to register a mobile part at a base station in accordance with the generic term of Claim 1. The invention furthermore relates to a radio controlled communication system based on such a method in accordance with the generic term of Claim 8.

BACKGROUND

Radio-controlled communication systems such as, for example, DECT or WLAN communication systems, comprise a base station as well as at least one mobile part as a participant in the respective system. The mobile part and/or the base station are used by a customer or user.

Since no direct wire connection with the appurtenant base station exists, the participants or, respectively, the mobile parts must be connected to the base station or, respectively, registered at the base station via a so-called registration procedure. In order to prevent unauthorized registrations of mobile parts located in adjacent apartments, the input of a PIN number is required as an example of general authorization information.

To the extent that a PIN number is mentioned in the following, it is always to be understood as general authorization information. Thus, it could also have a different appearance than an actual PIN number.

However, market studies have shown that many users are overtaxed with the input of the concrete PIN number and return the devices, base station and/or mobile part to the dealer.

The problem is aggravated by the fact that the registration procedure started manually or automatically for the registration of a mobile part at an appurtenant base station is designed in such a way that it will completely break off the registration procedure following an incorrectly inputted PIN number. In that case, the registration procedure must be initiated all over again.

To assure that a user of a radio-controlled communication system described above can manage it with ease, the devices are delivered for example with a pre-registered status.

Another approach consists of realizing an automatic registration which is activated when, for example, a mobile part is placed in the base station.

Such a method has been realized for example in the case of so-called Gigaset Communication Systems. If there the mobile part is placed into the charging box of the base station, the automatic registration procedure is passed through so that the mobile part is registered at the base station without requiring the input of a PIN number by a user.

But an automatic registration could for example also be started if an existing system is expanded by the purchase of an additional mobile part or if the base station is not equipped with a charging box.

It is furthermore known that many radio-controlled communication systems have a permanently set base PIN number, a so-called default PIN number. An example of such a default PIN number is the number: 0000.

It should also be mentioned here that a default PIN number is only to be seen as an example of default authorization information in general terms.

SUMMARY OF THE INVENTION

In order to further reduce the overburdening of users during the registration of a mobile part at an appurtenant base station, it is the objective of the invention to further simplify such a procedure, starting from a procedure as mentioned at the beginning.

In addition, in the same context, it is the objective of the invention—starting from a radio-controlled communication system of the type mentioned at the beginning—to improve such a radio-controlled communication system in such a way that the overburdening of a user during the registration of a mobile part at an appurtenant base station will be reduced even further.

The first part of the task at hand is solved in accordance with the invention by a method for the registration of a mobile part at a base station that involves the procedural steps indicated in the characterizing part of Claim 1.

The second part of the task at hand is solved in accordance with the invention through a radio-controlled communication system that involves the attributes indicated in the characterizing part of Claim 8.

In accordance with them, a method is claimed involving several procedural steps. In this context, a default authorization information controlling the radio-controlled communication system is transmitted to the base station. Then, in a subsequent procedural step, the correctness of the transmitted authorization information will be recognized by the base station during the check for correctness of the transmitted authorization information as long as a reference authorization information consulted during the check for correctness has not yet been changed.

Reference authorization information is intended to mean the authorization information stored in the base station that matches the default authorization information at the start-up of the device and that may be altered by a customer or, respectively, a user.

The transmitted authorization information is checked by the base station for the presence of the default authorization information if the base station recognizes the incorrectness of the transmitted authorization information.

If in this context the presence of the default authorization information is recognized, the base station will switch to a registration status that will allow a further transmission of authorization information by the mobile part. In this context, following the receipt of such authorization information, the base station will switch in each case to the same procedural step during which the base station checks the authorization information for correctness.

If, on the other hand, the presence of the default authorization information is not recognized, the base station will abort the registration procedure.

With regard to the radio-controlled communication system in accordance with invention, the base station and a mobile part registered at the base station are equipped for the execution of the method in accordance with the invention in such a way that technical means designed accordingly in each case will be available.

With the procedural steps in accordance with the invention and the existing technical means at the base station and a corresponding mobile part, the registration procedure is simplified when the mobile part automatically starts a first registration attempt with the permanently set base PIN number. If this base PIN number is still valid, for example because the customer in question has not changed it yet—which, based on experience, is the case with most communication systems of this kind—the registration procedure for this mobile part can be entirely completed at once. The customer in questions does not need to enter a PIN number at all.

However, if the PIN number is no longer valid because, for example, the customer in question has already changed it, the initial registration attempt will fail. But, due to the so-called default PIN number, the base station recognizes that this registration attempt involves an automatic registration attempt by the mobile part and not an erroneous input by a user. In that case, the base station permits an immediate second registration attempt during which the user or, respectively, the customer in question must now input the correct PIN number manually.

This second registration attempt, as stated before, is initiated automatically without the base station or the mobile part having to be prepared for registration again. The registration procedure has been simplified for this reason as well.

To repeat, the advantage of the proposed solution thus consists of the fact that the user who has not changed the default PIN number of the system does not need to enter a PIN number during the registration of the mobile part at the base station. Thus, for a great number of customers, a registration is possible without their having to input a PIN number. If the base PIN number has already been changed, the base station will recognize the automatic registration attempt by way of the base PIN number and will not regard it as a failed attempt but will instead allow the user to make a new manual attempt immediately thereafter without the current registration procedure being interrupted in the course thereof.

Advantageous embodiments of the invention are the subject of subclaims.

Subsequently, the authorization information is entered by the user for further transmission of the authorization information. Thus, the user has the concrete opportunity to complete the registration procedure successfully.

In the case of another advantageous embodiment of the invention, the base station will abort the registration procedure after a preset number of repetitive loop passages so that there will be no endless loop formation during the registration procedure.

A repetitive loop passage during the registration procedure may perhaps occur if during the second registration attempt the base PIN number is entered manually by the user.

In another advantageous embodiment of the invention, the registration procedure for the registration of a mobile part at an appurtenant base station is started automatically in the base station when the mobile part is placed into the charging box of an appurtenant base station.

In another advantageous embodiment of the invention, the registration procedure for the registration of a mobile part at an appurtenant base station is started automatically in the mobile part when the mobile part is placed into the charging box of an appurtenant base station or when the mobile part is turned on without having been registered at any base station.

The respective automatic start of the registration procedure considerably simplifies the handling by the user because he/she will not need to resort to any manual measures whatsoever in order to start the registration procedure.

If the mobile part identifies the automatically transmitted authorization information as automatically transmitted authorization information by transmitting an additional information, it will be assured that the base station is aware that the transmitted authorization information involves automatically transmitted authorization information.

The same applies to the mobile part when the base station informs the mobile part prior to the transmission of the authorization information that it will support the procedure in accordance with one of Claims 1 through 6. The mobile part can then be prevented from operating in accordance with the claimed method if the base station is not at all able to operate in a corresponding manner.

With regard to a concrete radio-controlled communication system, an advantageous embodiment of the invention is one in which the respective technical means are formed by discrete structural elements that interact with each other in terms of electrical engineering and telecommunication technology and that operate at least in part in program-controlled fashion.

With such a combination of characteristics, a desired radio-controlled communication system with extremely small dimensions can be constructed.

BRIEF DESCRIPTION OF THE DRAWINGS

In the following, an embodiment of the invention will be explained in detail by means of a drawing.

DETAILED DESCRIPTION

Figure 1:
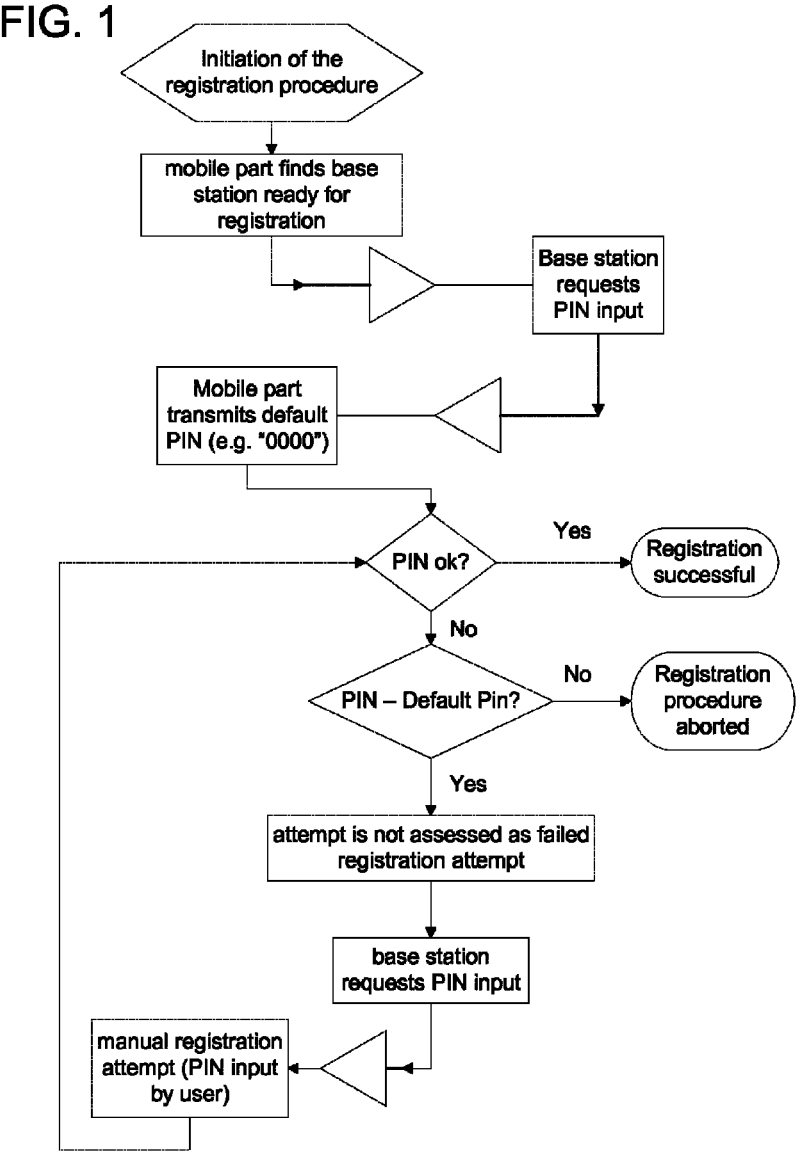
FIG. 1—a schematic flow diagram of the method in accordance with the invention, and FIG. 2—the principles of a radio-controlled communication system in accordance with the invention.

In accordance with FIG. 1, the initiation of the registration procedure happens first through the occurrence of a predetermined event. This may, for example, be the placement of the mobile part in the charging box of the base station. But it could also be an event generated manually.

Following the initiation of the registration procedure, the mobile part will find a base station ready for registration.

The base station will then request the entry of a PIN number. This may also occur implicitly.

If the initiation of the registration procedure involves an automatic initiation of the registration procedure, the mobile part will automatically transmit to the base station a permanently set base PIN number, the so-called default PIN number, stored in the mobile part.

If it involves a manual initiation of the registration procedure by a user, a manually entered PIN number could also be transmitted at this time which, however, is not represented in detail in the flow diagram because it is not part of the measures in accordance with the invention.

The base station will check the correctness of the transmitted PIN number regardless of how the PIN number was generated or whether or not it is valid.

If the transmitted PIN number is recognized as correct, the registration was successful and the registration procedure will be completed.

If the transmitted PIN number is recognized as incorrect, the base station will check the PIN number to determine if the transmitted PIN number is the so-called default PIN number.

If it does not involve the so-called default PIN number, the registration procedure will be discontinued. A new registration will then be possible only if the registration procedure is started completely anew.

If, however, it involves the so-called default PIN number, the registration attempt will not be regarded as failed and the registration procedure will not be discontinued. Instead, the base station will request the manual entry of a PIN number by the user.

This manually entered PIN number will then be checked again for correctness by the base station.

If the manually entered PIN number is recognized as correct, the registration attempt will be successful.

If the manually entered PIN number is recognized as not correct, it will be checked again to determine whether or not the manually entered PIN number involves the so-called default PIN number.

If it does not involve the so-called default PIN number, the registration procedure will be discontinued. A new registration will then be possible only if the registration procedure is started completely anew.

However, if it involves the so-called default PIN number, the registration attempt will not be regarded as failed and the registration procedure will not be discontinued. Instead, the base station will request the manual entry of a PIN number by the user.

The operation will then be repeated as already described before.

In an advantageous embodiment of the registration procedure in accordance with the invention which is not shown in detail in FIG. 1, the number of permitted repetitions is predetermined. In a concrete case of application, this number may be one.

Figure 2:
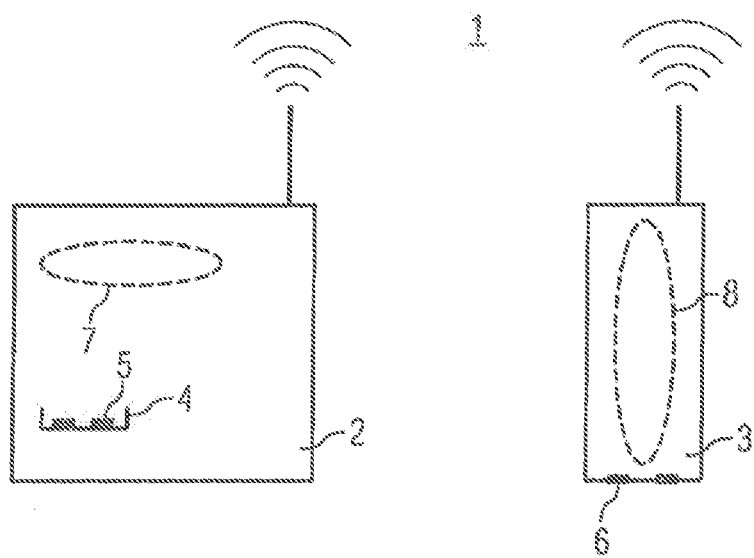

In FIG. 2, a radio-controlled communication system 1 in accordance with the invention is shown which comprises a base station 2 and at least one single mobile part 3.

In this context, mobile part 3 is registered with the base station in accordance with the registration procedure described in conjunction with FIG. 1.

The base station 2 is equipped with a charging box 4 with corresponding electrical charging pins 5.

The mobile part 3 is equipped with corresponding counter charging pins 6 relative to the charging pins 5 of the base station.

The registration procedure with the aid of which the mobile part 3 is registered at the base station 2 is initiated in accordance with the embodiment at hand according to FIG. 2 by the fact that the mobile part 3 was placed in the charging box 4 of the base station 2 at some prior time to the effect that the charging pins 5 of the charging box 4 of the base station and the charging pins 6 of the mobile part 3 contacted each other.

For the execution of said registration procedure, the base station 2 and the mobile part 3 each are equipped with correspondingly designed technical means 7 for the base station 2 or, respectively, 8 for the mobile part 3.

In this case, in accordance with the embodiment at hand, the correspondingly designed technical means 7 or, respectively, 8 are formed by discrete structural elements that interact with each other in electrical engineering and communication technology terms and that operate at least partially in program controlled fashion.

We claim:

1. A method of registering a mobile part at a base station ready for registration to form a radio-controlled communication system, comprising:

seeking a base station ready for registration using the mobile part;

transmitting a permanently set default authorization information from the mobile part to a base station;

evaluating the transmitted authorization information for correctness using the base station by comparing the transmitted authorization information against reference authorization information stored in the base station;

registering the mobile part with the base station if the transmitted authorization information of the mobile part matches the reference authorization information of the base station;

wherein if the transmitted authorization information and the reference authorization information do not match, then the base station determines whether the transmitted authorization information matches a corresponding identical permanently set default reference authorization information in the base station; and wherein if the base station determines that the transmitted authorization information matches the corresponding identical permanently set default reference authorization information, permitting the input of further authorization information at the mobile part, and thereafter reevaluating whether this further authorization information matches the reference authorization information of the base station, where if upon reevaluation, the further authorization information is determined to be correct, registering the mobile part; and wherein if the further authorization information does not match the reference authorization information, then the base station aborts the registration process.

2. The method of claim 1, wherein the further authorization information is entered by the user.

3. The method of claim 1, wherein the registration is aborted by the base station after a predetermined number of repetitive unsuccessful authorization attempts.

4. The method of claim 1, wherein the base station includes a charging box, and wherein the registration procedure is automatically started when the mobile part is placed in the base station's charging box.

5. The method of claim 1, wherein the base station includes a charging box, and wherein the registration procedure is automatically started when one of either: the mobile part is placed in the base station's charging box, or the mobile part, never having been registered at a base station, is powered on.

6. The method of claim 1, wherein the mobile part identifies the transmitted authorization information as automatically transmitted authorization information by transmitting additional information.

7. The method of claim 1, wherein prior to the transmission of authorization information from the mobile part, the base station communicates to the mobile part that it will support the registration method.

8. A radio-controlled communication system comprising:

at least one mobile part configured to have a permanently set default authorization information associated therewith, capable of transmitting said authorization information, and capable of seeking a base station ready for registration; and a base station configured to have corresponding identical permanently set default reference authorization information, configured to also have configurable reference authorization information, capable of receiving a transmission of authorization information from the mobile part, and capable of evaluating the received transmission of authorization information;

wherein if the transmitted authorization information matches the configurable reference authorization information, then the mobile part is registered at the base station;

wherein if the transmitted authorization information and the reference authorization information do not match, then the base station determines whether the transmitted authorization information matches the corresponding identical permanently set default reference authorization information in the base station; and wherein if the base station determines that the transmitted authorization information matches the corresponding identical permanently set default reference authorization information, permitting the input of further authorization information, and thereafter reevaluating whether this further authorization information is correct, where if upon reevaluation, the further authorization information is determined to be correct, registering the mobile part; and wherein if the further authorization information does not match the configurable reference authorization information, then the base station aborts the registration process.

9. Radio-controlled communication system in accordance with claim 8, wherein the respective technical means designed accordingly are formed by discrete structural elements that interact with each other in terms of electrical engineering and communications technology and that operate at least partially in program-controlled fashion.

* * * * *